US012783467B2

(12) United States Patent
Aubin et al.

(10) Patent No.: US 12,783,467 B2
(45) Date of Patent: Nov. 3, 2026

(54) SECURE LOADING AND EXECUTION OF USER-DEFINED CONTENT ON EMBEDDED REMOTE TERMINAL UNIT CONTROLLER

(71) Applicant: Schneider Electric Systems, USA Inc., Foxborough, MA (US)

(72) Inventors: Philip Aubin, Kanata (CA); Salih Utku Karaaslan, Ottawa (CA); Milan Stevanovic, Grenoble (FR); Mourad Goumrhar, Voreppe (FR); Wayne Johnston, Ottawa (CA)

(73) Assignee: Schneider Electric Systems USA, Inc., Foxborough, MA (US)

( * ) Notice: Subject to any disclaimer, the term of this patent is extended or adjusted under 35 U.S.C. 154(b) by 118 days.

(21) Appl. No.: 17/557,894

(22) Filed: Dec. 21, 2021

(65) Prior Publication Data

US 2023/0132276 A1 Apr. 27, 2023

Related U.S. Application Data

(60) Provisional application No. 63/271,769, filed on Oct. 26, 2021.

(51) Int. Cl.

| | |
|---|---|
| ***G06F 16/182*** | (2019.01) |
| ***G06F 9/445*** | (2018.01) |
| ***G06F 16/11*** | (2019.01) |
| ***G06F 21/62*** | (2013.01) |
| ***G06F 21/64*** | (2013.01) |

(52) U.S. Cl.

CPC ...... *G06F 16/1844* (2019.01); *G06F 9/44521* (2013.01); *G06F 16/119* (2019.01); *G06F 21/6218* (2013.01); *G06F 21/64* (2013.01)

(58) Field of Classification Search

CPC ............ G06F 16/1844; G06F 9/44521; G06F 16/119; G06F 21/6218; G06F 21/64; G06F 21/572; G06F 21/71

USPC ........................................ 707/634, 822, 827

See application file for complete search history.

(56) References Cited

U.S. PATENT DOCUMENTS

2014/0101727 A1* 4/2014 Okuyama .............. H04L 63/20 726/4
2015/0039872 A1* 2/2015 Jorden ................. G06F 21/645 713/1
2018/0239921 A1* 8/2018 Goyal ................ G06F 21/6227
2019/0392050 A1 12/2019 Weil et al.

(Continued)

FOREIGN PATENT DOCUMENTS

WO 2020252088 A1 12/2020

OTHER PUBLICATIONS

Extended European Search Report from EP Application No. 22193663.6, dated Jan. 9, 2023, 4 pages.

(Continued)

*Primary Examiner* — Phong H Nguyen
(74) *Attorney, Agent, or Firm* — Stinson LLP

(57) ABSTRACT

Secure loading and execution of user-defined content on an embedded controller associated with a remote terminal unit (RTU) includes providing a factory default image for the RTU having a default secured read only filesystem and providing a developer image for extending the RTU functionality, having a read/write filesystem equivalent working in conjunction with the read only filesystem.

20 Claims, 7 Drawing Sheets

(56) References Cited

U.S. PATENT DOCUMENTS

| | | | | |
|---|---|---|---|---|
| 2020/0320041 | A1* | 10/2020 | Fitzer | G06F 16/183 |
| 2021/0318988 | A1* | 10/2021 | Jacobson | G06F 16/178 |

OTHER PUBLICATIONS

Office Action from EP Application No. 22193663.6, dated Sep. 9, 2025, 5 pages.
Office Action and Search Report from AE Application No. P6001709/2022, dated May 22, 2025, 7 pages.

* cited by examiner

SECURE LOADING AND EXECUTION OF USER-DEFINED CONTENT ON EMBEDDED REMOTE TERMINAL UNIT CONTROLLER

CROSS-REFERENCE TO RELATED APPLICATION

This application claims priority from U.S. Provisional Patent Application No. 63/271,769, filed Oct. 26, 2021, the entire disclosure of which is incorporated herein by reference.

BACKGROUND

Conventional automation and control systems have limited remote terminal unit (RTU) functionality. A systems integrator that wishes to extend RTU functionality must develop its own applications. Improvements in secure loading and execution of content deployed on the RTU is needed.

SUMMARY

Aspects of the present disclosure permit secure loading and execution of user-defined content on an embedded controller, including protecting content on a remote terminal unit (RTU).

By incorporating the RTU into its system, an automation and control systems integrator embodying aspects of the present disclosure can extend the operation of RTU functions. The integrator does so by adding its own applications and intellectual property as a layer on top of the RTU features. This provides underlying functionality for accessing RTU data as well as securely loading and executing applications, and includes cybersecurity configurations. By providing an integrated environment, the integrator can leverage the features of the RTU environment and extend functionality in a flexible way, without the need to add the base functionality into its applications. This saves the integrator time in developing its applications, gives it flexibility to extend RTU functionality securely, and provides the users of the automation and control system trust in the content deployed on the RTU. The separation of RTU functions and extended application content across separate CPUs isolate critical RTU control and SCADA communication functions from the functional extensions of integrator content.

A method for securely loading and executing user-defined content on an remote RTU embodies aspects of the present disclosure. The RTU comprises an embedded controller and a memory storing a factory default image for the RTU. The factory default image includes a default secured read only filesystem, which defines predetermined functionality of the RTU. The method comprises creating user-defined content in a development environment for the RTU and providing a developer image for the RTU. The developer image includes a read/write filesystem equivalent of the read only filesystem that includes the user-defined content. The method includes executing, by the embedded controller, an overlay process to overlay the read/write filesystem on top of the read only filesystem to create a merged filesystem. The merged filesystem defines the predetermined functionality of the RTU and defines extended functionality of the RTU based on the user-defined content. The method also includes deploying the merged filesystem to the embedded controller for execution.

In an aspect, a method for securely loading and executing user-defined content on an RTU includes executing the merged filesystem on the embedded controller when authenticity of the created user-defined content is validated and executing the default secured read only filesystem on the embedded controller when authenticity of the created user-defined content is not validated.

In another aspect, an RTU comprises a memory storing a factory default image for the RTU and an embedded controller. The factory default image includes a default secured read only filesystem defining predetermined functionality of the RTU. The embedded controller is configured to execute the factory default image for performing the predetermined functionality of the RTU. The memory further stores a developer image for the RTU that includes a read/write filesystem equivalent of the read only filesystem. The read/write filesystem includes user-defined content created in a development environment for the RTU. The read/write filesystem overlays the read only filesystem to create a merged filesystem that defines the predetermined functionality of the RTU and defines extended functionality of the RTU based on the user-defined content. The embedded controller is further configured to execute the merged filesystem in response to validation of the created user-defined content.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
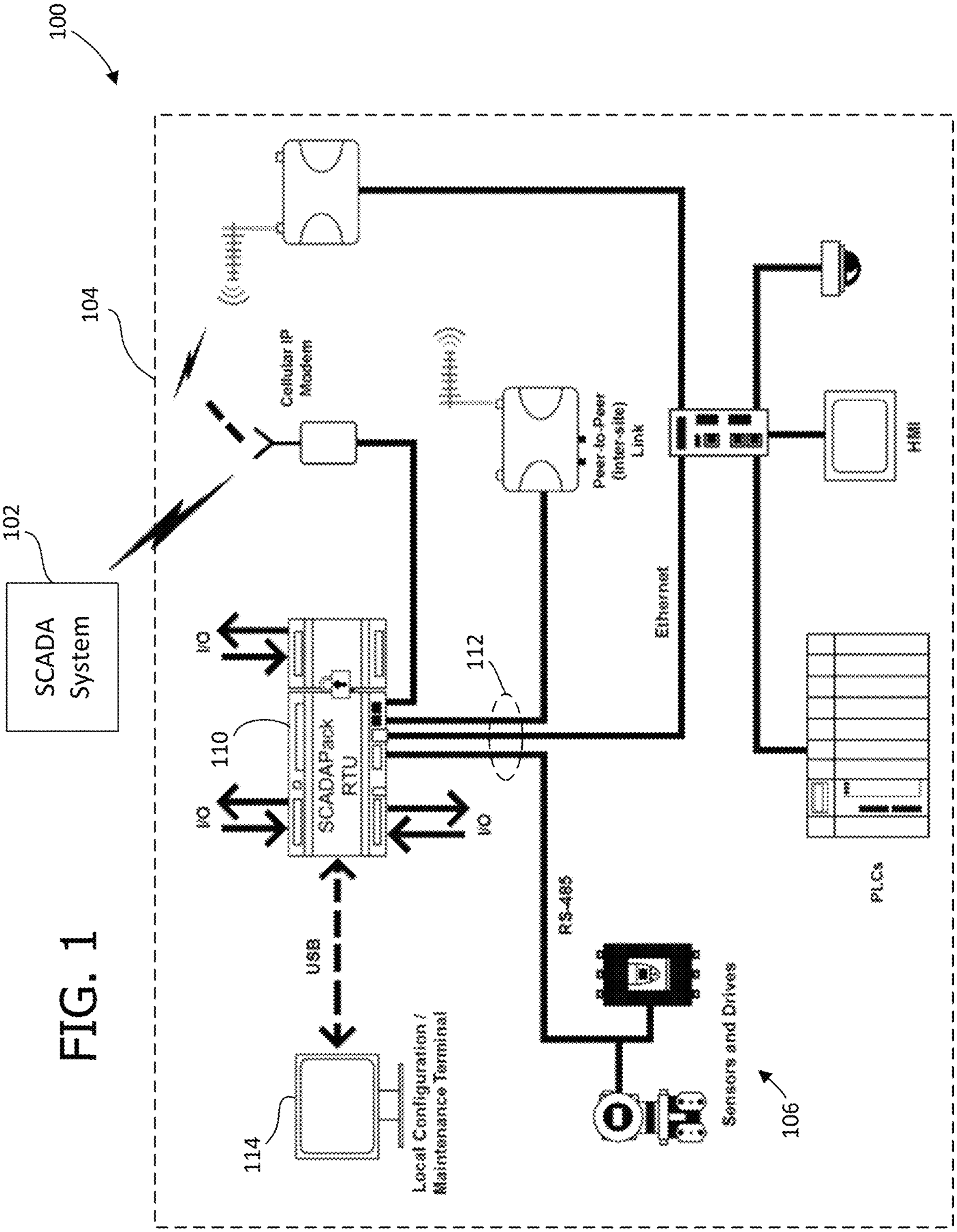
FIG. 1 illustrates a remote terminal unit (RTU) substation of an automation system according to an embodiment.

Referring to FIG. 1, a schematic overview of an automation system is shown 100. In the illustrated embodiment, the automation system 100 includes a Supervisory Control and Data Acquisition (SCADA) system 102 coupled to a remote substation 104 via a communications network, such as a private data radio network and/or a cellular telephone network. The substation 104 includes a number of peripherals 106, including sensors, actuators, drives, and the like. The substation 104 further includes at least one remote terminal unit (RTU) 110 for data acquisition from the substation 104 and/or from the SCADA system 102. In an embodiment, the RTU 110 is used as a control device. A communication bus 112 provides communication for the complete substation 104 and all parts of the substation are accordingly connected thereto, whether directly or indirectly. The RTU 110 is configured to be connected to a computer 114 (e.g., a personal computer, desktop, laptop, workstation machine, etc.) to access and control settings and parameters as well as a real-time database.

The RTU 110 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 110 in an oil and gas application include: tank monitoring and automation; well test automation; Emergency Shut-Down (ESD) at well heads; well production and optimization; and measurement.

In an oil and gas environment, for example, substation 104 is located at a well site to gather data about various aspects of the well site for monitoring and tracking purposes. The substation 104, which acts as a control unit, includes RTU 110 for collecting data on pump motor operation (e.g., motor speed and load). A variable speed drive motor controller, for example, generates this motor data. The RTU 110 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 110 can determine the tension or load (vertical axis) on the rod versus the displacement (horizontal axis) of the rod per stroke or pump cycle (i.e., upward and downward movement). Other data collected by RTU 110 from the field sensors may include fluid flow rate, temperature, pressure, and the like.

In an embodiment, RTU 110 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 110 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU embodying aspects of the present disclosure involves autonomous, remotely located assets, including critical infrastructure assets, where high control system, monitoring, and reporting availability as well as data analytics associated with control systems, asset performance, and custom application features are requested.

Figure 2:
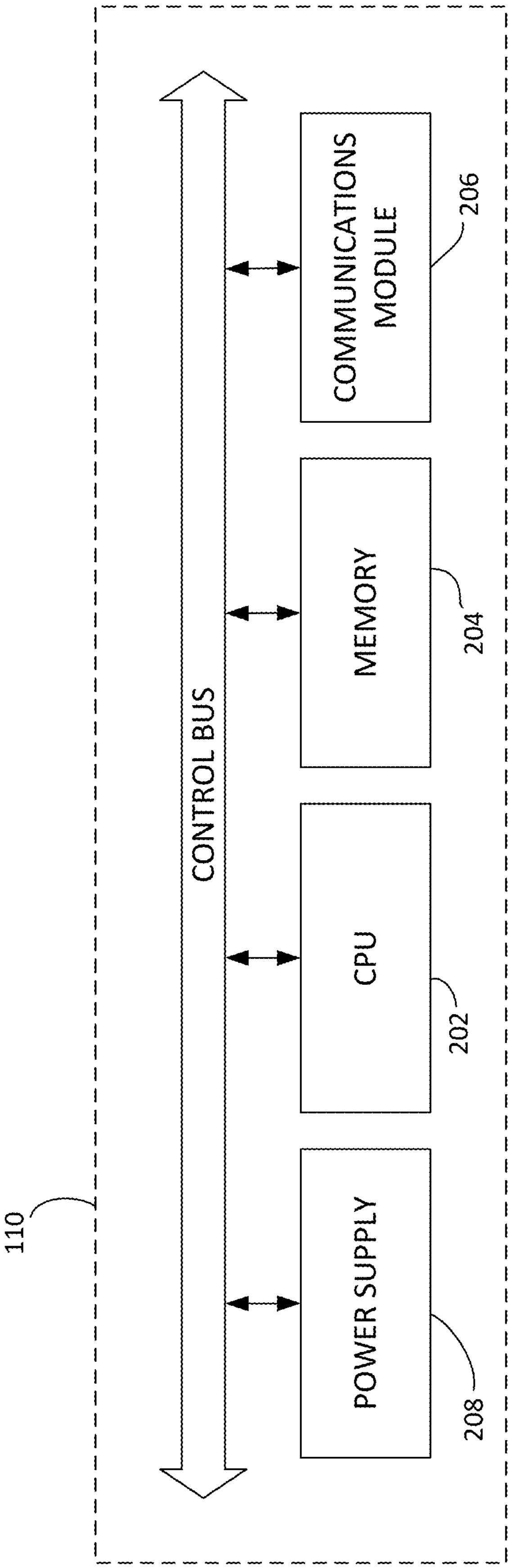
FIG. 2 is a block diagram of the RTU of FIG. 1.

FIG. 2 illustrates RTU 110, including its major components. As shown, RTU 110 includes an embedded controller, or central processing unit (CPU) 202, which is the controller module of RTU 110. In addition, RTU 110 includes a memory 204 (e.g., volatile and non-volatile), and a communications module 206 all coupled to a power supply module 208. In an embodiment, the communications module 206 includes a serial port or onboard modem with an I/O (input/output) interface. The RTU 110 is configured to be interfaced to multiple control stations and intelligent electronic devices using different communication media such as RS485, RS232, Ethernet, microwave, satellite, etc. When a communication interface is established, either device can initiate the data transfer. In addition, RTU 110 may include one or more digital input modules providing a plurality of digital inputs, one or more digital output modules providing a plurality of digital outputs, one or more analog input modules providing a plurality of analog inputs, and one or more analog output modules providing a plurality of analog outputs.

Figure 3:
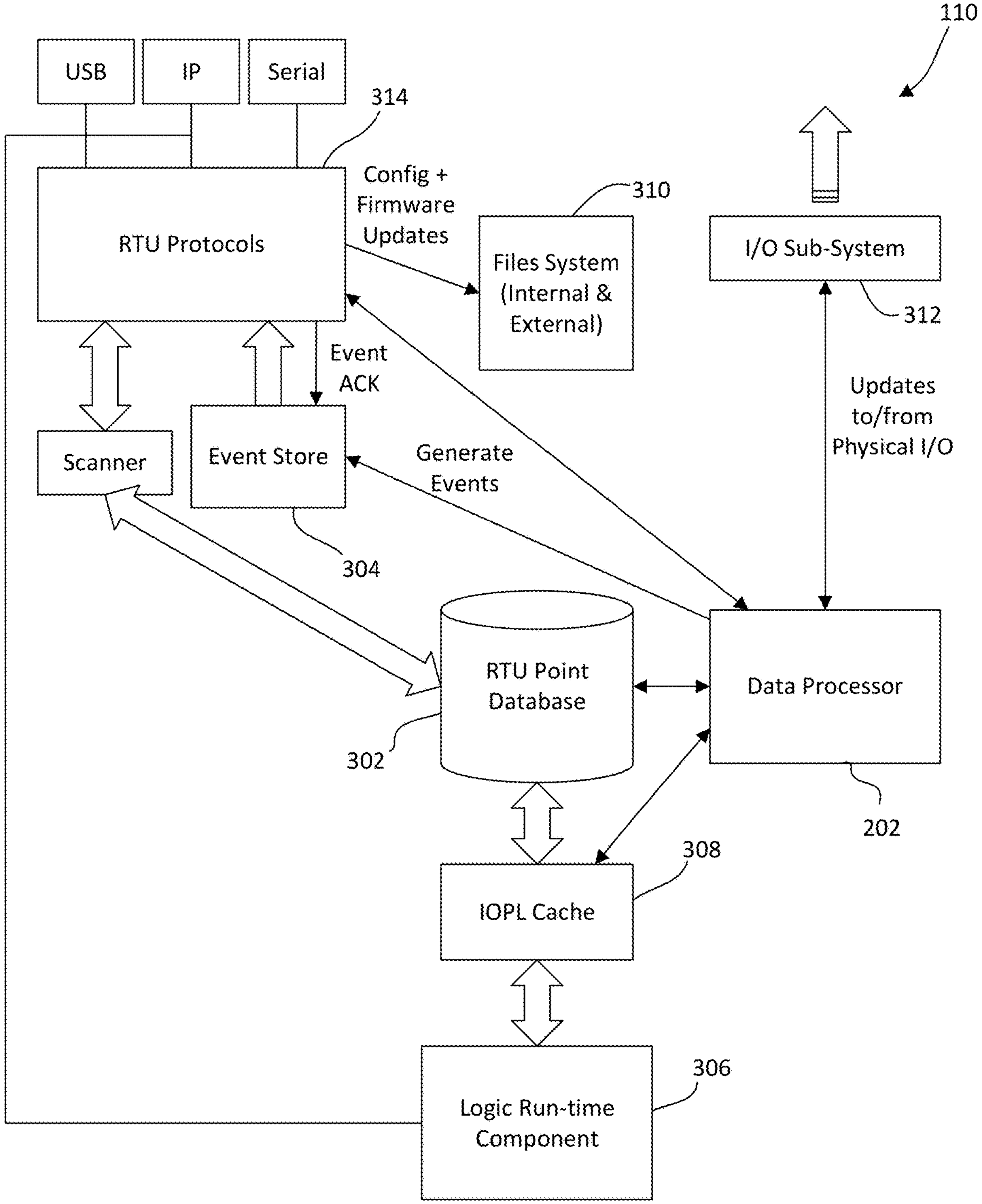
FIG. 3 is a block diagram illustrating an example internal architecture of the RTU of FIG. 1.

FIG. 3 illustrates aspects of an example internal architecture of RTU 110 according to an embodiment. The CPU 202, indicated in FIG. 3 as a data processor, is the central component by which changes to the status of RTU 110 are managed. The RTU 110 includes a point database 302, an event store 304, a logic run-time component 306, and a cache 308 of the IOPL (i.e., I/O process list, which copies instructions for logic run-time state and end-of-scan data transfers). In the illustrated embodiment, RTU 110 further includes a filesystem 310, an I/O sub-system 312, and a store of RTU protocols 314.

The CPU 202 is responsible for updating the point database 302 based on information from other parts of substation 104, including physical I/O updates from upstream remote protocols via the I/O sub-system 312, local or downstream device data, local run-time logic execution, etc. In an embodiment, the internal systems of RTU 110 manage event storage, with time-stamped data. Events are captured in the event store 304 based on an RTU configuration associated with physical I/O, downstream data sources, and internal data items (including data items coming from logic run-time 306). Events are reported upstream to client stations through remote protocols 314. Confirmation messages from upstream client stations remove successfully delivered events from the RTU event store 304. The filesystem 310 of the RTU 110 provides storage for delivery of data items such as full or incremental configuration, firmware upgrades, logic applications, etc.

An automation and control systems integrator embodying aspects of the present disclosure can extend the functionality of RTU 110. The integrator adds its own applications and intellectual property as a layer on top of the preexisting RTU features for execution by the RTU CPU 202. This provides underlying functionality for accessing RTU data as well as securely loading and executing extended applications, and includes cybersecurity configurations. By providing an integrated environment, the integrator can leverage the features of the RTU environment and extend functionality in a flexible way, without the need to add the base functionality into the preexisting applications of RTU 110. This saves the integrator time in developing its applications, gives it flexibility to extend RTU functionality securely, and provides the users of the automation and control system trust in the content deployed on the RTU 110. Moreover, the separation of RTU functions and extended application content across separate CPUs can isolate critical RTU control and SCADA communication functions from the functional extensions of integrator content.

An embedded RTU controller, namely CPU 202, provides an architecture using overlay filesystem elements to flexibly layer integrator content on secured RTU functionality. In addition, the embedded RTU controller embodying aspects of the present disclosure transfers an integrator certificate to the RTU CPU 202 to validate the deployed content extending the RTU functionality and permits secure boot validating the authenticity of the base functionality accessing RTU data and the integrator content but does not impact critical RTU control system and SCADA communication operations if the integrator content is not validated as being authentic.

Aspects of the present disclosure utilize an overlay-filesystem that presents a combined filesystem resulting from overlaying one filesystem on top of the other. The overlay filesystem approach is 'hybrid', because the objects that appear in the filesystem do not always appear to belong to that filesystem. In many cases, an object accessed in the union filesystem implementation is indistinguishable from accessing the corresponding object from the original filesystem. For example, an overlay filesystem combines two filesystems—an 'upper' filesystem and a 'lower' filesystem. When a name exists in both filesystems, the object in the 'upper' filesystem is visible while the object in the 'lower' filesystem is either hidden or, in the case of directories, merged with the 'upper' object.

Figure 4:
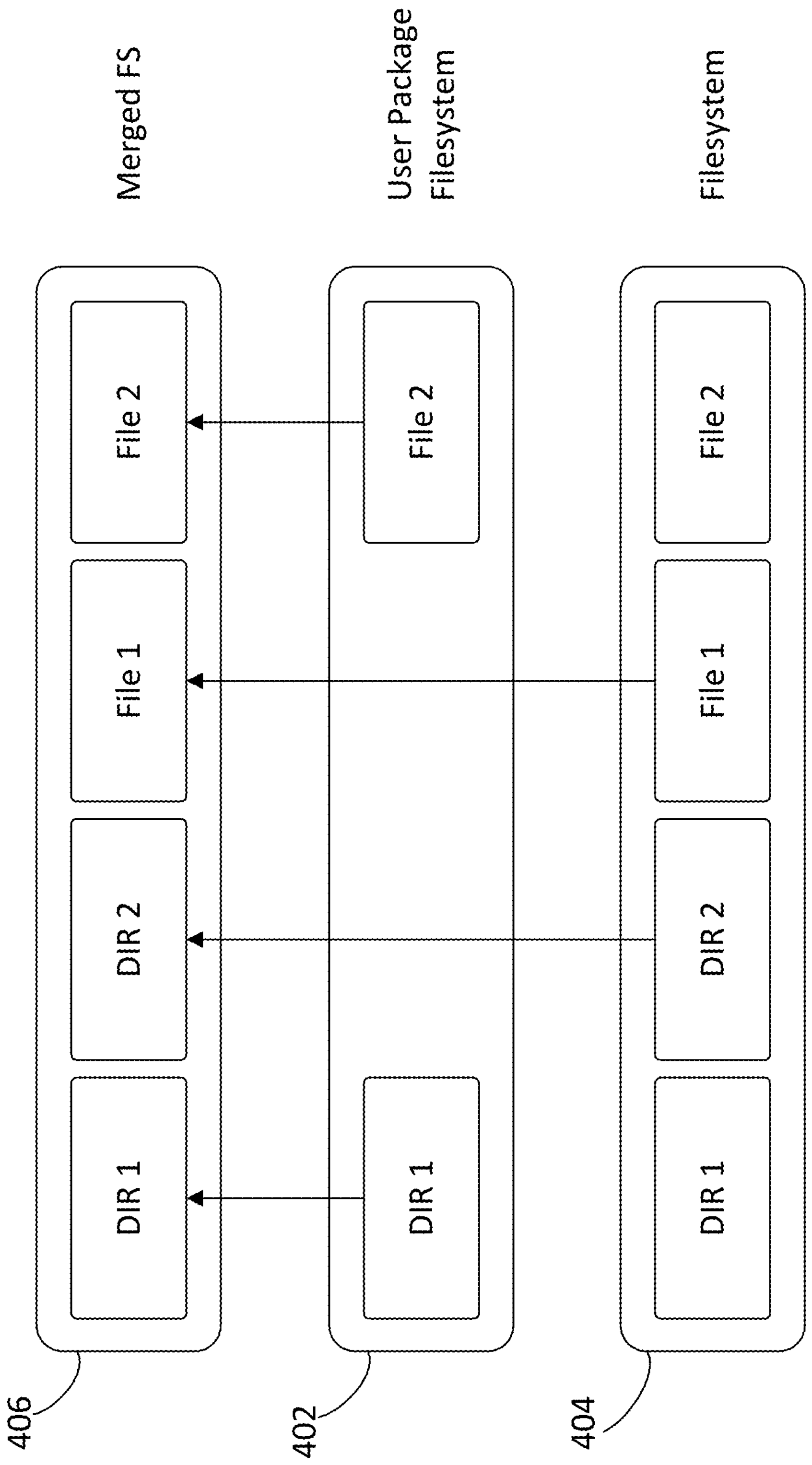
FIG. 4 is an example of a merged overlay of two filesystems according to an embodiment.

FIG. 4 is an example of a merged overlay of two filesystems according to an embodiment. Overlay filesystem operation provided by Linux, for example, is used to add integrator-specific configuration and applications on top of the production filesystem image for RTU 110. In this embodiment, a Software Development Kit (SDK) provided for the RTU 110 includes the tools needed for development of the integrator content, along with the tools to identify and generate the overlay. The integrator begins with a developer read/write (R/W) filesystem, provided by the manufacturer along with the SDK environment on a virtual machine (VM), for example, to create its own applications and packages. These additional applications and packages are built as a user packaged filesystem 402. The user package filesystem 402 overlays the integrator Linux filesystem and adds additional applications and packages. According to integrator need, aspects of the present disclosure provide the R/W filesystem on NAND partition and/or an SD card.

As shown in FIG. 4, the user package image 402 is new filesystem that will be overlaid on top of, i.e., merged with, a default image filesystem 404 as an overlay (referred to as OverlayFS) resulting in a merged filesystem 406. Although referred to as the user package image or filesystem, it is to be understood that user package filesystem 402 includes content from the developer R/W filesystem. In this instance, the default image filesystem 404 provides the core functionality of RTU 110. An environment and tools are provided to help the integrator to create the user package filesystem 402 from a development image. To start the user package filesystem 402, the same security work flow is applied as for the developer default image filesystem 404.

A wide range of filesystems supported by Linux can be the lower filesystem, but not all filesystems that are mountable by Linux have the features needed for OverlayFS to work. The lower filesystem in this embodiment does not need to be writable. The lower filesystem can even be another OverlayFS. The upper filesystem (i.e., user package filesystem 402) is preferably writable and supports the creation of trusted.* and/or user.* extended attributes. In addition, the upper filesystem provides valid d_type in readdir responses. A read-only overlay of two read-only filesystems may use any filesystem type.

The overlay filesystem component, signed for deployment to the RTU 110, is transferred using the existing RTU tools, extending the functionality with the integrator's content. The validation of the Linux applications environment allows the RTU functionality to continue operating if the authenticity of the added application content is rejected. The cybersecurity features combine the functionality of the RTU secure boot mechanism, adding signed boot scripts and signed content that is validated by the boot-chain prior to deployment on the device, and during Linux operating system start-up.

The user package filesystem 402, OverlayFS in this example, provides flexibility for integrators to make modifications and integrate new features. This flexibility has impact on security and integrators are responsible to manage security for these additional packages provided by them. At the same time, integrator content does not impact the production image of filesystem 404 and this image can be considered as a default factory image for device.

In an embodiment, the default factory image filesystem 404 provides:

- Default secured read only filesystem—factory default image for RTU 110.
- Environment to load the read/write filesystem equivalent of the read only filesystem—developer image.
- Environment to flash these images on RTU 110.
- Environment to switch between these images.

Figure 5:
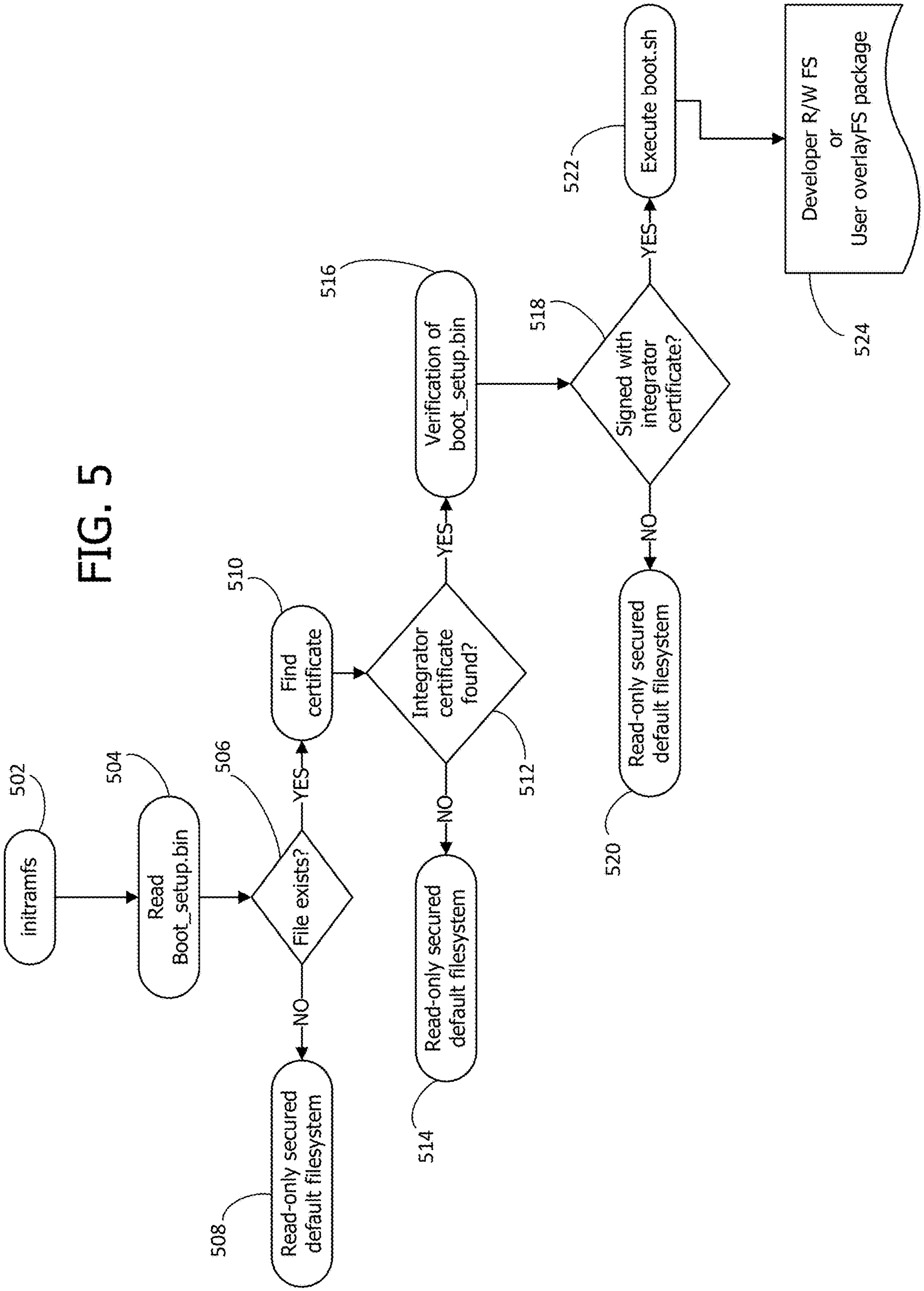
FIG. 5 is a flow diagram illustrating an example process for a start developer image executed by an integrator according to an embodiment.

FIG. 5 is a flow diagram illustrating an example process for starting a developer image of user package filesystem 402 created by an integrator. In an embodiment, the integrator provides an R/W development filesystem (user package filesystem 402) and creates a script to start this filesystem on the RTU 110 platform. An initramfs filesystem according to an embodiment provides an environment to securely mount the developer R/W filesystem, or an end user package 402, on top of the default image of filesystem 404. Beginning at 502, CPU 202 executes initramfs to read, verify, and execute a boot script (if existing) and to start a developer or end-user final image of merged filesystem 406. An overlay boot script is stored in a defined memory location inside memory, such as Quad Serial Peripheral Interface (QSPI) memory, as one binary (boot_setup.bin) with: Boot.sh Linux script; and CMS file for verification. At 504, boot_setup.bin is read to determine at 506 whether user package filesystem 402 is present. If not, CPU 202 limits the operations of RTU 110 at 508 to those of the secured default filesystem 404.

Proceeding to 510, if user package filesystem 402 is present, CPU 202 locates a certificate for verifying the overlay file. In the absence of a certificate at 512, CPU 202 limits the operations of RTU 110 at 514 to those of the secured default filesystem 404. If the certificate is present at 512, CPU 202 continues to 516 for verification of boot_setup.bin.

The integrator is responsible to create, sign, and flash boot_setup.bin. This is an example process to start developer image on RTU 110:

- Integrator creates secure boot_setup.bin file. This file is flashed in persistent memory. A slot is defined in QSPI for this purpose and the manufacturer provides tools to store or change this file in memory.
- On each boot, initramfs will check if boot_setup.bin exists and do a verification of this binary. If boot_setup.bin is verified, Linux will execute this script; if not, it will start a default image.

A signed integrator certificate is used at 518 to verify boot_setup.bin. Similar to earlier operations, CPU 202 limits the operations of RTU 110 at 520 to those of the secured default filesystem 404 in the absence of the signed certificate at 518. When CPU 202 verifies boot_setup.bin with signed integrator certificate, it executes boot.sh at 522, which implements the added functionality at 524 with the developer R/W filesystem or user package overlay filesystem 402.

Figure 6:
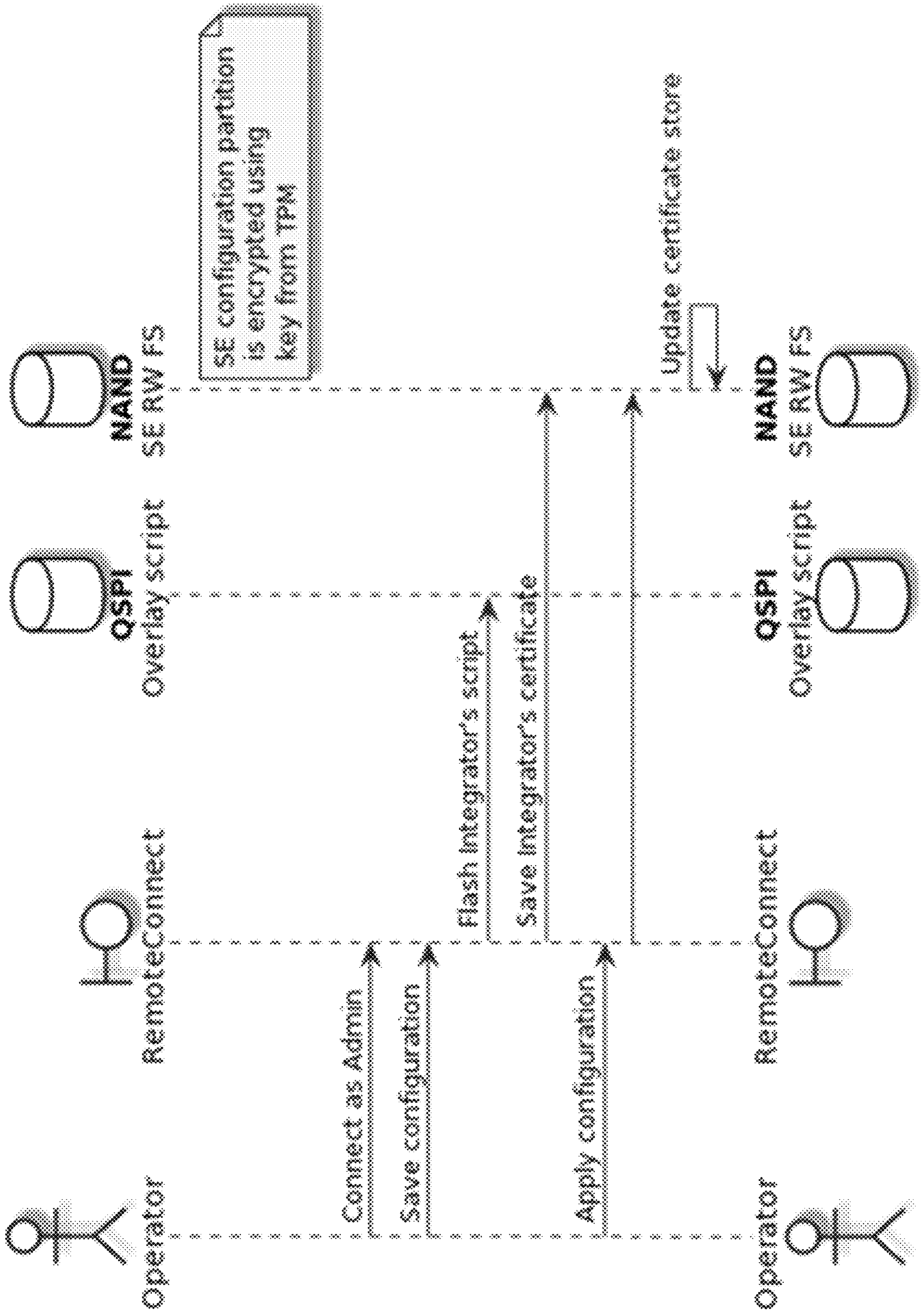
FIG. 6 illustrates an example process for creating self-signed certificates executed by the integrator according to an embodiment.

As described above, the integrator is responsible for creating its own self-signed certificates that can used for development, or the end user custom filesystem. FIG. 6 illustrates an example process for creating self-signed certificates executed by the integrator according to an embodiment.

The following are created by the integrator to manage the extensible content on RTU 110:

Private key (integrator.priv.key)

Self-signed certificate (integrator.crt.pem)

The shell script is signed on a host PC (e.g., computer 114) using:

integrator self-signed certificate integrator private key boot_script.sh (the integrator script for signing) to produce the following:

signed_boot_script.sh.cms (the integrator signed script executed from initramfs)

A system command is used to flash the integrator script on RTU 110.

An administrator is responsible to store the correct certificate on the board via RemoteConnect (e.g., by copying integrator.crt.pem to the /etc/ssl/certs/folder on the board). For example:

copy integrator.crt.pem to /etc/ssl/certs/

Rehash certificates with command—openssl rehash

Sync filesystem with command—sync

In an embodiment, user package filesystem 402 is installed locally on RTU 110 according a /usr/local hierarchy for use by the system administrator. The user package filesystem 402 needs to be safe from being overwritten when the system software is updated. It may be used for programs and data that are shareable amongst a group of hosts, but not found in /usr. Locally installed software must be placed within /usr/local rather than /usr unless it is being installed to replace or upgrade software in /usr.

Referring to TABLE I, the following directories in /usr/local according to an embodiment:

TABLE I

| Directory | Description |
|---|---|
| bin | Local binaries |
| etc | Host-specific system configuration for local binaries |
| games | Local game binaries |
| include | Local C header files |
| lib | Local libraries |
| man | Local online manuals |
| sbin | Local system binaries |
| share | Local architecture-independent hierarchy |
| src | Local source code |

Figure 7:
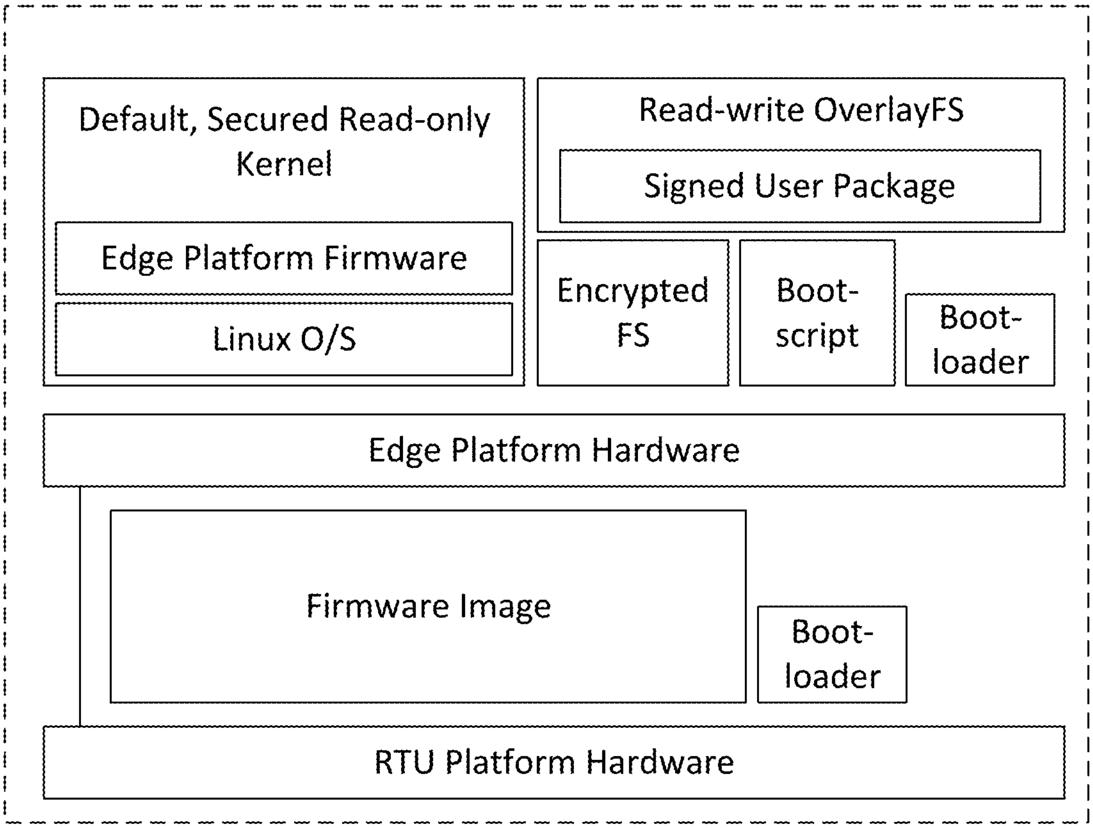
FIG. 7 is a block diagram illustrating an example of privileged components according to an embodiment.

FIG. 7 is a block diagram illustrating an example of privileged components according to an embodiment. In the illustrated embodiment, a user has privileged operation to load a signed boot-script, load an integrator or user security, and login with root mode access (for privileged management commands).

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method for securely loading and executing user-defined content on a remote terminal unit (RTU), the RTU comprising an embedded controller and a memory storing a factory default image for the RTU, the factory default image including a default secured read only filesystem, the default secured read only filesystem defining predetermined functionality of the RTU, the method comprising:

creating user-defined content in a development environment for the RTU, the user-defined content comprising extended application content defining extended functionality of the RTU different than the predetermined functionality;

executing a development tool to access a developer image for the RTU, the developer image including a read/write filesystem, the read/write filesystem being a developer equivalent of the read only filesystem, the read/write filesystem including the user-defined content;

executing, by the embedded controller, an overlay process to overlay the read/write filesystem on top of the read only filesystem to create a merged filesystem, the merged filesystem defining both the predetermined functionality of the RTU and the extended functionality of the RTU based on the user-defined content, the merged filesystem further being writeable;

executing an authentication process to validate an authenticity of the created user-defined content, wherein the authentication process includes signature verification of a certificate associated with the read/write filesystem, the certificate being stored in a Secure Sockets Layer (SSL) certificate directory on the RTU; and deploying the merged filesystem to the embedded controller for execution in response to validation of the authenticity of the created user-defined content.

2. The method of claim 1, further comprising generating a bootable script file, and wherein deploying the merged filesystem to the embedded controller for execution is responsive to execution of the bootable script file.

3. The method of claim 2, further comprising validating authenticity of the generated bootable script file before deploying the merged filesystem to the embedded controller for execution.

4. The method of claim 2, further comprising storing the bootable script file in a non-volatile memory.

5. The method of claim 1, wherein executing the overlay process includes hiding an object of the default secured read only filesystem when a corresponding object is present in the read/write filesystem.

6. The method of claim 1, wherein the certificate is a self-signed certificate created by an integrator.

7. The method of claim 1, further comprising hashing the certificate in the SSL certificate directory after storing the certificate.

8. A method for securely loading and executing user-defined content on a remote terminal unit (RTU), the RTU comprising an embedded controller and a memory storing a factory default image for the RTU, the factory default image including a default secured read only filesystem, the default secured read only filesystem defining predetermined functionality of the RTU, the method comprising:

creating user-defined content in a development environment for the RTU, the user-defined content comprising extended application content defining extended functionality of the RTU different than the predetermined functionality;

executing a development tool to access a developer image for the RTU, the developer image including a read/write filesystem, the read/write filesystem being a developer equivalent of the read only filesystem, the read/write filesystem including the user-defined content;

executing, by the embedded controller, an overlay process to overlay the read/write filesystem on top of the read only filesystem to create a merged filesystem, the merged filesystem defining both the predetermined functionality of the RTU and the extended functionality of the RTU based on the user-defined content, the merged filesystem further being writeable;

executing an authentication process, the authentication process including transferring a certificate to the RTU, the certificate being stored in a Secure Sockets Layer (SSL) certificate directory on the RTU for validating the user-defined content; and deploying the merged filesystem to the embedded controller for execution when authenticity of the created user-defined content is validated using the certificate and deploying the default secured read only filesystem to the embedded controller for execution when authenticity of the created user-defined content is not validated.

9. The method of claim 8, wherein the authentication process is configured to validate the authenticity of the created user-defined content before deploying the merged filesystem to the embedded controller for execution, wherein the authentication process includes signature verification of the certificate.

10. The method of claim 8, further comprising generating a bootable script file, and wherein deploying the merged filesystem to the embedded controller for execution is responsive to execution of the bootable script file.

11. The method of claim 10, wherein the authentication process includes validating authenticity of the generated bootable script file.

12. The method of claim 11, wherein deploying the default secured read only filesystem to the embedded controller for execution comprises executing the factory default image in response to determining the generated bootable script file is not authentic.

13. The method of claim 10, further comprising storing the bootable script file in a non-volatile memory.

14. The method of claim 8, wherein executing the overlay process includes hiding an object of the default secured read only filesystem when a corresponding object is present in the read/write filesystem.

15. A remote terminal unit (RTU) comprising:

a memory storing a factory default image for the RTU, the factory default image including a default secured read only filesystem, the default secured read only filesystem defining predetermined functionality of the RTU; and an embedded controller configured to execute the factory default image for performing the predetermined functionality of the RTU;

wherein the memory further stores a developer image for the RTU, the developer image including a read/write filesystem, the read/write filesystem being a developer equivalent of the read only filesystem, the read/write filesystem including user-defined content created in a development environment for the RTU, the user-defined content comprising extended application content defining extended functionality of the RTU different than the predetermined functionality, wherein the memory further includes a self-signed certificate associated with the read/write filesystem and stored in a Secure Sockets Layer (SSL) certificate directory on the RTU, wherein the read/write filesystem overlays the read only filesystem to create a merged filesystem, the merged filesystem defining both the predetermined functionality of the RTU and the extended functionality of the RTU based on the user-defined content, the merged filesystem further being writeable, and wherein the embedded controller is further configured to execute the merged filesystem in response to validation of the created user-defined content using the self-signed certificate.

16. The RTU of claim 15, wherein the embedded controller is further configured to execute the default secured read only filesystem instead of the merged filesystem when the created user-defined content is not validated.

17. The RTU of claim 15, wherein the self-signed certificate is configured for use in determining validation of the created user-defined content.

18. The RTU of claim 15, wherein the read/write filesystem includes a bootable script file for deploying the created user-defined content, and wherein the embedded controller is further configured to execute the bootable script file to execute the merged filesystem.

19. The RTU of claim 15, the embedded controller is further configured to execute the default secured read only filesystem when the created user-defined content is not validated.

20. The RTU of claim 15, the merged filesystem includes a hidden object of the default secured read only filesystem when a corresponding object is present in the read/write filesystem.

* * * * *